United States Patent
Reid

(10) Patent No.: US 10,495,250 B2
(45) Date of Patent: *Dec. 3, 2019

(54) VACUUM INSULATED STRUCTURE WITH END FITTING AND METHOD OF MAKING SAME

(71) Applicant: Concept Group, LLC, Wellesley, MA (US)

(72) Inventor: Aarne H Reid, Jupiter, FL (US)

(73) Assignee: Concept Group, LLC, Wellesley, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/841,427

(22) Filed: Dec. 14, 2017

(65) Prior Publication Data
US 2018/0106414 A1 Apr. 19, 2018

Related U.S. Application Data

(60) Continuation of application No. 14/953,756, filed on Nov. 30, 2015, now Pat. No. 9,874,303, which is a
(Continued)

(51) Int. Cl.
*F16L 9/14* (2006.01)
*F16L 59/065* (2006.01)
(Continued)

(52) U.S. Cl.
CPC ............... *F16L 59/065* (2013.01); *F16L 9/14* (2013.01); *F16L 11/16* (2013.01); *F16L 59/075* (2013.01);
(Continued)

(58) Field of Classification Search
CPC ........ F16L 11/16; F16L 2011/047; F16L 9/14; F16L 59/065; F16L 59/075; H01P 3/14; Y10T 29/49826
(Continued)

(56) References Cited

U.S. PATENT DOCUMENTS 1,362,805 A 12/1920 Kruse
1,457,504 A 6/1923 Cullen et al.
(Continued)

FOREIGN PATENT DOCUMENTS

DE 10019420 A1 10/2001
EP 0611614 A1 8/1994
(Continued)

OTHER PUBLICATIONS

Overview of NAS Battery for Load Management; CEC Energy Storage Workshop, Feb. 2005, pp. 1-22.
(Continued)

*Primary Examiner* — James F Hook
(74) *Attorney, Agent, or Firm* — BakerHostetler

(57) ABSTRACT

A vacuum insulated structure including a tube having an outer wall, a jacket surrounding the tube to enclose an annular insulating space, the jacket having an end that terminates at the outer wall of the tube, a seal formed between the end of the jacket and the tube to preserve a vacuum within the insulating space, and a fitting affixed to one of the tube and the jacket for coupling the vacuum insulated structure to an external device. A method of making a vacuum insulated structure including forming a tube and a jacket, positioning the jacket over the tube to form an annular insulating space, with an end of the jacket being positioned adjacent to an outer wall of the tube to form a vent, causing air to escape through the vent, sealing the vent, and affixing a fitting to one of the tube and the jacket.

17 Claims, 6 Drawing Sheets

Related U.S. Application Data division of application No. 13/644,199, filed on Oct. 3, 2012, now Pat. No. 9,243,726.

(51) Int. Cl.
| | |
|---|---|
| H01P 3/14 | (2006.01) |
| F16L 11/16 | (2006.01) |
| F16L 11/04 | (2006.01) |
| F16L 59/075 | (2006.01) |

(52) U.S. Cl.
CPC .......... *F16L 2011/047* (2013.01); *H01P 3/14* (2013.01); *Y10T 29/49826* (2015.01)

(58) Field of Classification Search
USPC ...................................................... 138/148
See application file for complete search history.

(56) References Cited

U.S. PATENT DOCUMENTS

| | | | |
|---|---|---|---|
| 2,085,737 A | 7/1937 | Cereghino | |
| 2,225,660 A * | 12/1940 | Rogers | F42B 33/0264 |
| | | | 138/148 |
| 2,362,893 A | 11/1944 | Durst | |
| 2,363,893 A | 11/1944 | Monier | |
| 2,573,594 A | 10/1951 | Nofzinger | |
| 2,666,979 A | 1/1954 | Van Dusen | |
| 2,722,336 A * | 11/1955 | Wexler | A47J 41/028 |
| | | | 114/74 A |
| 2,807,074 A | 9/1957 | Schroeder | |
| 2,867,242 A | 1/1959 | Harris et al. | |
| 3,119,238 A | 1/1964 | Chamberlain et al. | |
| 3,146,005 A | 8/1964 | Peyton | |
| 3,195,564 A * | 7/1965 | Carney | F16K 49/00 |
| | | | 137/375 |
| 3,265,236 A | 8/1966 | Gibbon et al. | |
| 3,460,512 A | 8/1969 | Keichler et al. | |
| 3,510,323 A | 5/1970 | Wismer et al. | |
| 3,706,208 A | 12/1972 | Kadi et al. | |
| 3,760,142 A | 9/1973 | Schoenthaler | |
| 4,055,268 A | 10/1977 | Barthel | |
| 4,117,201 A * | 9/1978 | Keifert | F16L 58/18 |
| | | | 138/148 |
| 4,157,779 A * | 6/1979 | Ishii | B23K 1/18 |
| | | | 215/12.1 |
| 4,200,199 A | 4/1980 | Perkins et al. | |
| 4,332,401 A | 6/1982 | Stephenson et al. | |
| 4,396,211 A | 8/1983 | McStravick et al. | |
| 4,399,919 A | 8/1983 | Posnansky | |
| 4,450,872 A | 5/1984 | Orcutt | |
| 4,491,347 A * | 1/1985 | Gustafson | F16L 59/141 |
| | | | 285/353 |
| 4,515,397 A | 5/1985 | Nowobilski et al. | |
| 4,653,469 A | 3/1987 | Miyaji et al. | |
| 4,696,104 A | 9/1987 | Vanzetti et al. | |
| 4,746,054 A | 5/1988 | Moats et al. | |
| 4,903,631 A | 2/1990 | Morris | |
| 4,919,299 A | 4/1990 | Haines | |
| 4,997,124 A | 3/1991 | Kitabatake et al. | |
| 5,038,706 A | 8/1991 | Morris | |
| 5,052,816 A | 10/1991 | Nakamura et al. | |
| 5,108,390 A | 4/1992 | Potocky et al. | |
| 5,206,705 A | 4/1993 | Tokura | |
| 5,235,817 A | 8/1993 | Gallagher et al. | |
| 5,411,897 A | 5/1995 | Harvey et al. | |
| 5,520,682 A | 5/1996 | Baust et al. | |
| 5,524,630 A | 6/1996 | Crowley | |
| 5,573,140 A | 11/1996 | Satomi et al. | |
| 5,600,752 A | 2/1997 | Lopatinsky | |
| 5,650,020 A | 7/1997 | Ohta et al. | |
| 5,674,218 A | 10/1997 | Rubinsky et al. | |
| 5,742,048 A | 4/1998 | Kobayashi et al. | |
| 5,862,973 A | 1/1999 | Wasserman | |
| 5,869,801 A | 2/1999 | Paton et al. | |
| 5,870,823 A | 2/1999 | Bezama et al. | |
| 6,095,405 A | 8/2000 | Kim et al. | |
| 6,145,547 A | 11/2000 | Villatte | |
| 6,166,907 A | 12/2000 | Chien | |
| 6,186,390 B1 | 2/2001 | Tadauchi et al. | |
| 6,216,745 B1 * | 4/2001 | Augustynowicz | F16L 59/065 |
| | | | 138/114 |
| 6,360,935 B1 | 3/2002 | Flake | |
| 6,706,037 B2 | 3/2004 | Zvuloni et al. | |
| 6,875,209 B2 | 4/2005 | Zvuloni et al. | |
| 6,936,045 B2 | 8/2005 | Yu et al. | |
| 7,064,429 B2 | 6/2006 | Bemmerl et al. | |
| 7,139,172 B2 | 11/2006 | Bezama et al. | |
| 7,150,743 B2 | 12/2006 | Zvuloni et al. | |
| 7,203,064 B2 | 4/2007 | Mongia et al. | |
| 7,207,985 B2 | 4/2007 | Duong et al. | |
| 7,258,161 B2 | 8/2007 | Cosley et al. | |
| 7,298,623 B1 | 11/2007 | Kuczynski et al. | |
| RE40,049 E | 2/2008 | Li | |
| 7,334,630 B2 | 2/2008 | Goodson et al. | |
| 7,354,434 B2 | 4/2008 | Zvuloni et al. | |
| 7,356,434 B2 | 4/2008 | Wu et al. | |
| 7,361,187 B2 | 4/2008 | Duong et al. | |
| 7,374,063 B2 | 5/2008 | Reid | |
| 7,393,350 B2 | 7/2008 | Maurice | |
| 7,419,085 B2 | 9/2008 | Fukunaka et al. | |
| 7,451,785 B2 | 11/2008 | Taira et al. | |
| 7,460,369 B1 | 12/2008 | Blish, II | |
| 7,485,117 B2 | 2/2009 | Damasco et al. | |
| 7,497,365 B2 | 3/2009 | Kimura et al. | |
| 7,510,534 B2 | 3/2009 | Burdorff et al. | |
| 7,515,415 B2 | 4/2009 | Monfarad et al. | |
| 7,608,071 B2 | 10/2009 | Duong et al. | |
| 7,621,889 B2 | 11/2009 | Duong et al. | |
| 7,621,890 B2 | 11/2009 | Duong et al. | |
| 7,681,299 B2 | 3/2010 | Reid | |
| 7,909,227 B2 | 3/2011 | Duong et al. | |
| 7,980,171 B2 | 7/2011 | Groll | |
| 8,353,332 B2 | 1/2013 | Reid | |
| 8,434,665 B2 | 5/2013 | Motomura et al. | |
| 9,243,726 B2 | 1/2016 | Reid | |
| 9,463,918 B2 | 10/2016 | Reid | |
| 9,874,303 B2 * | 1/2018 | Reid | F16L 59/065 |
| 2001/0030225 A1 | 10/2001 | Nagata | |
| 2002/0114937 A1 | 8/2002 | Albert et al. | |
| 2003/0079554 A1 | 5/2003 | Van Cleve | |
| 2003/0146224 A1 | 8/2003 | Fujii et al. | |
| 2004/0129756 A1 | 7/2004 | Zakel et al. | |
| 2004/0226979 A1 | 11/2004 | Sato et al. | |
| 2005/0211711 A1 | 9/2005 | Reid | |
| 2006/0054234 A1 * | 3/2006 | White | F16L 59/141 |
| | | | 138/149 |
| 2006/0054243 A1 | 3/2006 | Walton | |
| 2006/0061092 A1 | 3/2006 | Keyes | |
| 2006/0071052 A1 | 4/2006 | Conlon et al. | |
| 2006/0076389 A1 | 4/2006 | Kemper et al. | |
| 2006/0086773 A1 | 4/2006 | Sanftleben et al. | |
| 2006/0282039 A1 | 12/2006 | Duong et al. | |
| 2007/0102477 A1 | 5/2007 | Prince | |
| 2007/0102478 A1 | 5/2007 | Prince | |
| 2007/0235497 A1 | 10/2007 | Hsu | |
| 2007/0235498 A1 | 10/2007 | Hsu | |
| 2007/0235499 A1 | 10/2007 | Hsu | |
| 2007/0246510 A1 | 10/2007 | Hsu | |
| 2008/0006598 A1 | 1/2008 | Fujii et al. | |
| 2008/0036076 A1 | 2/2008 | Ouyang | |
| 2008/0061111 A1 | 3/2008 | Kiriyama | |
| 2008/0083816 A1 | 4/2008 | Leinbach et al. | |
| 2008/0121642 A1 | 5/2008 | Reid | |
| 2008/0169037 A1 * | 7/2008 | Ziegler | F16L 39/005 |
| | | | 138/149 |
| 2008/0197170 A1 | 8/2008 | Prince | |
| 2008/0285230 A1 | 11/2008 | Bojan et al. | |
| 2009/0031659 A1 | 2/2009 | Kalfon | |
| 2009/0065499 A1 | 3/2009 | England | |
| 2009/0068070 A1 | 3/2009 | Hashimoto et al. | |
| 2009/0123221 A1 | 5/2009 | Marshall | |
| 2009/0152331 A1 | 6/2009 | Schmitt et al. | |
| 2010/0057064 A1 | 3/2010 | Baust et al. | |

(56) References Cited

U.S. PATENT DOCUMENTS

| | | |
|---|---|---|
| 2010/0057067 A1 | 3/2010 | Baust et al. |
| 2010/0076421 A1 | 3/2010 | Baust et al. |
| 2010/0096037 A1* | 4/2010 | Lee .................. F16L 9/18 138/114 |
| 2010/0258290 A1 | 10/2010 | Bass |
| 2011/0056582 A1 | 3/2011 | Walle et al. |
| 2011/0264084 A1 | 10/2011 | Reid |
| 2012/0085070 A1 | 4/2012 | Chou et al. |
| 2012/0090817 A1* | 4/2012 | Reid .................. G06F 1/20 165/80.2 |
| 2012/0175007 A1 | 7/2012 | Pan et al. |
| 2012/0228364 A1 | 9/2012 | Vegelahn |
| 2012/0282792 A1 | 11/2012 | Schloegl |
| 2012/0318808 A1 | 12/2012 | McCormick |
| 2013/0105496 A1 | 5/2013 | Jung |
| 2014/0008417 A1 | 1/2014 | Visser et al. |
| 2014/0090737 A1 | 4/2014 | Reid |
| 2014/0182608 A1 | 7/2014 | Egoyants et al. |
| 2015/0110548 A1 | 4/2015 | Reid |
| 2015/0149800 A1 | 5/2015 | Gendler et al. |
| 2015/0151893 A1 | 6/2015 | Wengreen et al. |
| 2015/0159800 A1 | 6/2015 | Kimura et al. |
| 2015/0168050 A1 | 6/2015 | Cur et al. |
| 2015/0260332 A1 | 9/2015 | Reid |
| 2015/0271927 A1 | 9/2015 | Cocklin et al. |
| 2015/0345930 A1 | 12/2015 | Ikeda et al. |
| 2016/0044963 A1 | 2/2016 | Saleem |
| 2016/0084425 A1 | 3/2016 | Reid |
| 2016/0279725 A1 | 9/2016 | Azdasht |
| 2016/0354853 A1 | 12/2016 | Azdasht |
| 2016/0368072 A1 | 12/2016 | Senga et al. |
| 2017/0043938 A1 | 2/2017 | Reid |
| 2017/0062774 A1 | 3/2017 | Reid |
| 2017/0120362 A1 | 5/2017 | Reid et al. |
| 2017/0165773 A1 | 6/2017 | Azdasht et al. |
| 2017/0225276 A1 | 8/2017 | Reid |
| 2017/0253416 A1 | 9/2017 | Reid |

FOREIGN PATENT DOCUMENTS

| | | |
|---|---|---|
| EP | 1294022 A2 | 3/2003 |
| FR | 2550313 A1 | 2/1985 |
| GB | 2105226 A | 3/1983 |
| JP | 06-142909 A | 5/1994 |
| JP | 3654249 B2 | 6/2005 |
| JP | 2005-224832 A | 8/2005 |
| JP | 3962782 B1 | 8/2007 |
| JP | 2008-045956 A | 2/2008 |
| WO | 03/025476 A2 | 3/2003 |
| WO | 2013/034455 A1 | 3/2013 |
| WO | 2018/093776 A1 | 5/2018 |

OTHER PUBLICATIONS

National Research Council, "Assessment of Research Needs for Advanced Battery Systems", 1982, 203 pages.
https://en.wikipedia.org/wiki/Sodium-sulfur_battery_June 11, 2018, 5 pages.
Hodkinson et al., "Lightweight Electric/Hybrid Vehicle Design", 2001, 4 pages.
Guidotti et al., "Characterization of Vacuum-Multifoil Insulation for Long-Life Thermal Batteries", U.S. Department of Energy, Office of Scientific and Technical Information, Apr. 17, 2000, 3 pages.
Daniel et al., "Handbook of Battery Materials", Wiley-VCH Publishers, 2011, vol. 1, 3 pages.

* cited by examiner

VACUUM INSULATED STRUCTURE WITH END FITTING AND METHOD OF MAKING SAME

CROSS REFERENCE TO RELATED APPLICATIONS

This application is a continuation of U.S. patent application Ser. No. 14/953,756, "Vacuum Insulated Structure With End Fitting And Method Of Making Same" (filed Nov. 30, 2015, and now allowed) which is a divisional of U.S. patent application Ser. No. 13/644,199, "Vacuum Insulated Structure With End Fitting And Method Of Making Same" (filed Oct. 3, 2012, and now issued as U.S. Pat. No. 9,243,726). The entireties of the foregoing applications are incorporated by reference herein for any and all purposes.

TECHNICAL FIELD

The present disclosure relates to the field of vacuum-insulated structures and methods of fabricating such structures.

BACKGROUND

Vacuum insulated structures have many practical uses and can be constructed as described, for example, in U.S. Pat. Nos. 7,681,299 and 7,374,063, in which tube walls and jacket walls are vacuum brazed together to create a strong metallurgical joint that has a higher melting temperature than the braze material itself. Typically, the tube walls and the outer jacket walls of such vacuum insulated structures are quite thin, often less than about 0.010" inches. Consequently, it can be difficult to affix a fitting onto a vacuum insulated structure to enable the structure to be mounted or supported by an external device. In particular, an attempt to weld or solder a fitting to a tube wall or the outer jacket wall of the structure risks perforating the thin wall and destroying the vacuum seal. Additionally, acid that is commonly contained in solder materials can erode into and eventually perforate the thin outer jacket wall. Further, the thin walls of the vacuum insulated structure may not be capable of supporting a threaded or compression-type fitting without sustaining damage.

SUMMARY

An embodiment of a vacuum insulated structure is described, the structure including a tube having an outer wall and a jacket surrounding the tube to enclose an annular insulating space between the tube and the jacket. The jacket has an end that terminates adjacent to the outer wall of the tube. A seal is formed between the end of the jacket and the outer wall of the tube to preserve a vacuum within the insulating space. A fitting is affixed to one of the tube and the jacket for coupling the vacuum insulated structure to an external device. The fitting may be affixed at any point along the length of the jacket, including near one of the ends of the jacket or at an intermediate portion along the jacket. Alternatively, the fitting may be affixed on the outer wall of the tube beyond the jacket.

In one variation, the seal is formed by a first brazing process and the fitting is affixed by a second brazing process. The two brazing process may be performed concurrently. Alternatively, the two brazing processes may be performed sequentially, first sealing the vent and then affixing the fitting.

The fitting may be any type of fitting, including but not limited to a welding socket, a female threaded fitting, a male threaded fitting, a compression fitting, a flange fitting, a custom fitting, and combinations thereof.

An embodiment of a method of making a vacuum insulated structure with a fitting is described. The method includes forming a tube having an outer diameter defined by an outer wall and forming a jacket having an end and an inner diameter at least slightly larger than the outer diameter of the tube. The jacket is positioned over the tube to form an annular insulating space between the jacket and the tube, with the end of the jacket being positioned adjacent to the outer wall of the tube to form a vent between the end of the jacket and the outer wall of the tube. A vacuum is drawn on the annular insulating space by causing air to evacuate the space through the vent, and the vent is then sealed to preserve the vacuum within the insulating space. Finally, a fitting is affixed to one of the tube and the jacket.

In one variation, sealing the vent includes positioning a bead of first braze material within the insulating space adjacent to the vent, heating the tube to cause the bead of first braze material to flow into the vent and form a joint between the tube and the jacket, and allowing the joint to cool, thereby sealing the vent.

In a further variation, affixing the fitting includes positioning a bead of second braze material between an inner surface of the fitting and an outer wall of the jacket, heating the jacket to cause the bead of second braze material to melt and form a joint between the jacket and the fitting, and allowing the joint to cool, thereby fusing the fitting to the jacket.

The steps of heating the tube and heating the jacket may be performed concurrently or sequentially; if sequentially, heating the tube and sealing the vents is preferable performed before heating the jacket and affixing the fitting. In one embodiment, evacuation of the insulating space and brazing is conducted in a vacuum oven.

BRIEF DESCRIPTION OF THE DRAWINGS

The above and other aspects, features, and advantages of the disclosed embodiments will be more apparent from the following more particular description thereof, presented in conjunction with the following drawings wherein.

DETAILED DESCRIPTION OF THE DRAWINGS

Figure 1A:
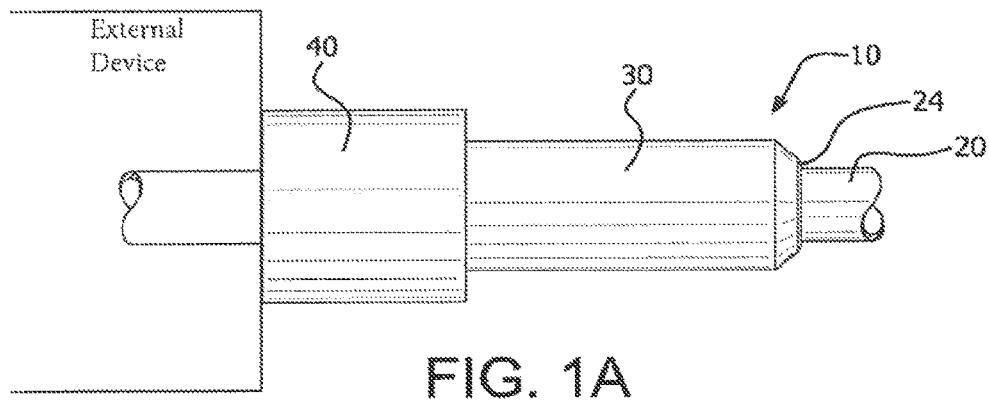
FIGS. 1A and 1B are a side view and a side cross-sectional view, respectively, showing an embodiment of a vacuum insulated structure with a fitting.
Figure 1B:
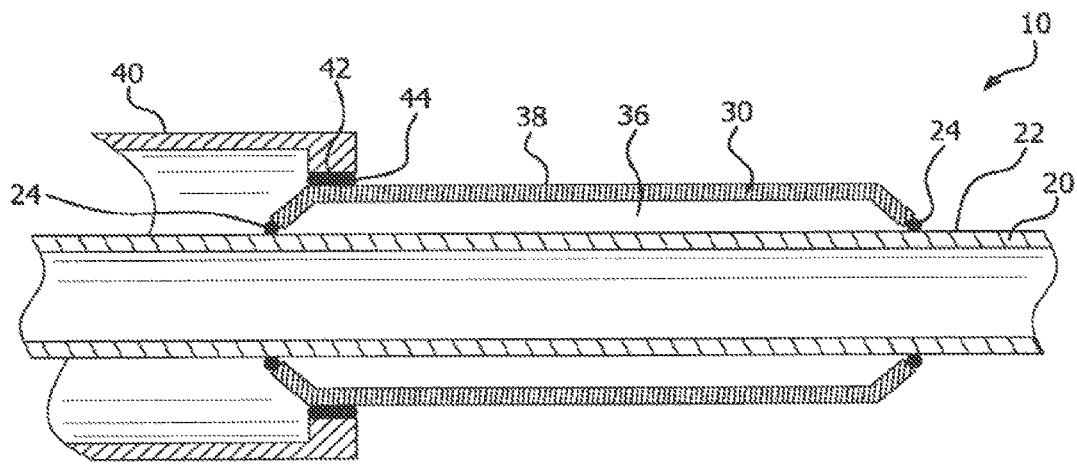
Figure 2A:
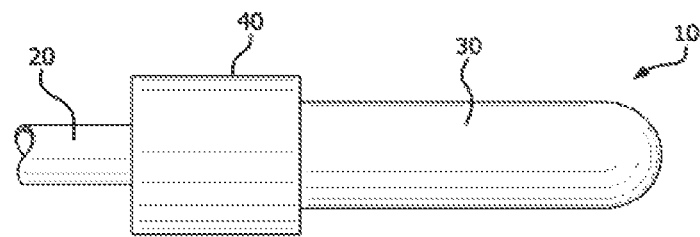
FIGS. 2A and 2B are a side view and a side cross-sectional view, respectively, of another embodiment of a vacuum insulated structure with a fitting.
Figure 2B:
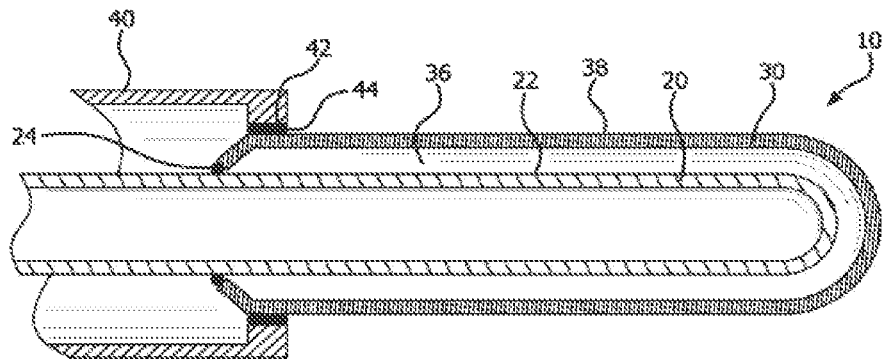

Two embodiments of a vacuum insulated structure 10 are shown in FIGS. 1A-1B and 2A-2B. Those embodiments are merely illustrative, it being understood that infinite other embodiments may be constructed having the same features as described herein.

The structure 10 includes a tube 20 having an inner wall 23, a jacket 30 surrounding at least a portion of the tube 20 and having at least one end 32, and a fitting 40 affixed to the jacket 30. In the depicted embodiments, the tube 20 is an elongate tube with a length many times its diameter. The jacket 30 has a geometry similar to that of the tube 20, to form a narrow annular space between the tube 20 and the jacket 30. However, the same principles of construction as described herein may be applied to a tube 20 of any shape with a correspondingly shaped jacket 20 and annular space. For example, the tube 20 and the jacket 30 may be generally spherical in shape.

In the embodiments as shown, the tube 20 has an outer diameter defined by an outer wall 22 of the tube 20. The jacket 30 has an inner diameter that is at least slightly larger than the outer diameter of the tube 20, so that an annular insulating space 36 is formed between the tube 20 and the jacket 30. The annular insulating space 36 is formed as a volume that will be put under vacuum, whereas the tube interior 26 can formed for accommodating devices, materials, or components that are desired to be insulated by annular insulating space 36, for example a surgical probe, or a cooling device for infrared imaging electronics. Structure 10 can also be used for, but is not limited to, insulating and installing aviation electronics and instruments for transporting tubes for oil, for transporting and storing fuel for hydrogen fuel cells, as thermal insulation for spacecraft components such as electronics, for thermal control of components of weapon systems. In particular, structure 10 is particularly suitable when devices or materials have to be insulated from effects of very large changes in temperature. For example, when insulating space craft electronics, the temperature difference may be in a range between −200.degree. C. and +150.degree. C., and structure 10 can be exposed to temperature difference of about $\Delta$600.degree. C.

Figure 3A:
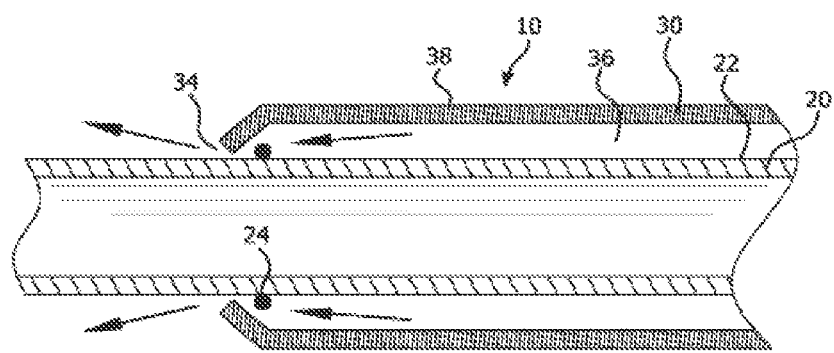
FIGS. 3A-3D are side cross-sectional views illustrating a method of assembling a vacuum insulated structure with a fitting.
Figure 3B:
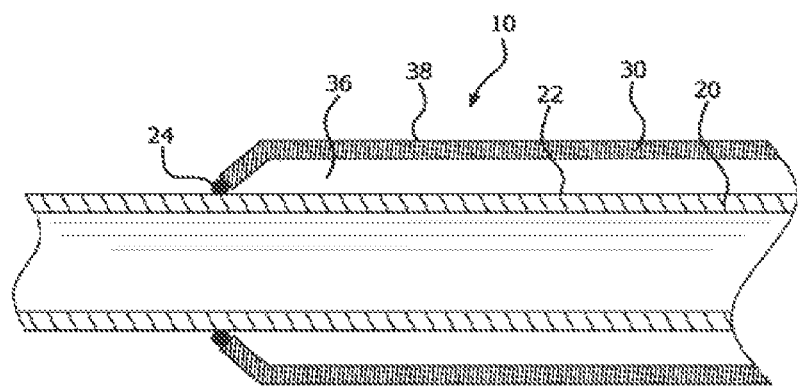

With FIGS. 3A-3B an exemplary method of making the vacuum inside tube interior 26 is shown. The annular insulating space 36 may be evacuated through a vent 34 located adjacent to the end 32 of the jacket 30. As shown, the vent 34 is a small gap between the end 32 of the jacket 30 and the outer wall 22 of the tube 20. The insulating space 30 may be evacuated by placing the entire structure 10 into a vacuum chamber and then drawing a vacuum in the chamber. As the pressure in the vacuum chamber decreases, gas (usually air) escapes from the insulating space 36 via the vent 34. Other methods for applying suction to the vent 34 may alternatively be used.

In one embodiment, the evacuation of the insulating space 36 achieves a pressure lower than the pressure applied to the vent 34 (i.e., the level of vacuum achieved in the vacuum insulating space 36 is deeper than the level of vacuum applied to the vent 34) as a result of the geometry of the walls bounding the vacuum insulating space 36 in the vicinity of the vent 34. In particular, the ends 32 of the jacket 30 are configured in the vicinity of the vents 34 to preferentially direct gas molecules toward the vent 34 in an ultra-low pressure free molecular flow regime in which the frequency of gas molecule collisions with the walls exceeds the frequency of gas molecule collisions with each other. The relative geometry of the jacket 30 and the tube 20 at the jacket ends 32 adjacent to the vent 34 has a guiding effect on gas molecules in a free molecular flow regime so that the flux of gas molecules out the vent 34 is greater than the flux of gas molecules into the vent 34. A highly insulating space having a low vacuum created by such geometry can be used in devices of miniature scale or in devices having insulating spaces of extremely narrow width. For example, insulating spaces 30 have been created incorporating this geometry with gaps on the order of 0.004" or smaller.

In gases under relatively modest vacuums, for example at pressures equal to or greater than about $10^{-2}$ torr at about 70.degree. F., molecule-to-molecule collisions dominate such that the number of interactions between the gas molecules themselves is large in comparison to the number of interactions between the gas molecules and the walls of a container for the gas molecules. In this circumstance, Maxwell's gas law accurately describes the molecular kinetic behavior of gas molecules. However, at greater (deeper) levels of vacuum, for example as pressures less than about $10^{-2}$ torr, and particularly at pressures less than about $10^{-4}$ torr at about 70.degree. F., a free molecular flow regime takes over because the scarcity of gas molecules causes the number of interactions between the gas molecules and the walls of the container to be large in comparison with the interactions between the gas molecules themselves. At such low pressures, the geometry of a space to which vacuum is applied becomes a controlling factor in the rate at which gas molecules exit the space via a vent as compared with the rate at which gas molecules enter the space via the vent.

While vacuum is being applied to the vent 34, the structure 10 may be heated to accelerate the motion of the gas molecules within the insulating space 36, so as to further bias the flux of gas molecules outward from the vent 34 as compared with inward into the vent 34. For example, tube 20 or the structure 10 may be heated to an elevated temperature and held at that temperature for a period of time during the evacuation process. Longer hold times may be used to further increase the vacuum achievable in the insulating space 36.

Once a desired level of vacuum has been achieved in the insulating space 36, the vent 34 is sealed to maintain the vacuum. In one embodiment, the vent 34 is sealable by a first braze material 24 that melts and flows into the vent 34 when heated to a brazing temperature, so that the end 32 of the jacket 30 is brazed to the outer wall 22 of the tube and the insulating space 36 is sealed off. The use of brazing to seal the evacuation vent of a vacuum-sealed structure is generally known in the art. To seal the vent 36, a bead of first braze material 24 is positioned on the outer wall 22 of the tube 20, slightly within the insulating space 36, near the vent 34 and the end 32 of the jacket, as shown in FIG. 3A. Prior to heating, the bead of first braze material 24 is solid and is preferably adhered to the outer wall 22 of the tube 20. For high vacuum applications, the first braze material is preferably free from flux, since flux can off-gas after brazing, thereby reducing the vacuum within the insulating jacket 36.

The first braze material 24 is positioned between the tube 20 and the jacket 30 near the vent 34 in such a manner that during the evacuation process (i.e., prior to the brazing process) the vent 34 is not blocked by the braze material 24. Toward the end of the evacuation process, as the desired level of vacuum is being achieved in the insulating space 36, sufficient heat is applied to the tube 20 or to the entire structure 10 to melt the first braze material 24 such that it flows by capillary action into the vent 34. The flowing braze material 24 seals the vent 34 and blocks the evacuation path from the insulating space 36, as shown in FIG. 3B. Flowing of the first braze material 24 is facilitated by any preheating that occurs by heating of the tube 20 or the structure 10 during the evacuation phase in order to enhance the ultimate level of vacuum achieved in the insulating space 36. After maintaining a sufficient temperature for a sufficient amount of time, the first braze material forms an alloyed joint between the tube 20 and the jacket 30. The joint formed by the first braze material 24 is then allowed to cool, so as to solidify and seal the vent 34 closed. Alternatively, other processes can be used for sealing the vent 34, including but not limited to a metal surgical process or a chemical process.

Figure 3C:
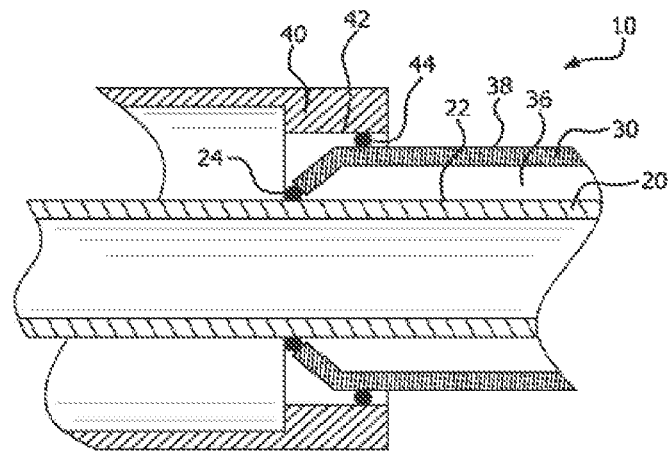
Figure 3D:
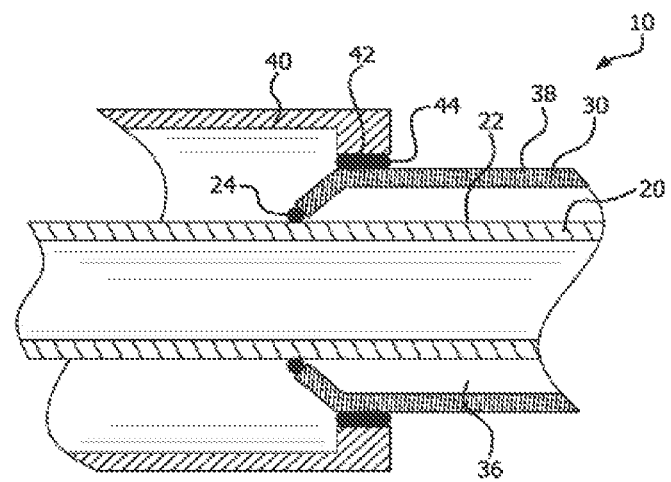

Fitting 40 may be attached to the structure 10, either to the tube 20 or to the jacket 30. FIGS. 3C and 3D depict a method of attaching a fitting 40 to jacket 30. In the depicted embodiments, the fitting 40 is attached to the jacket 30, noting that essentially the same process can be used for attachment to the tube 20 or the jacket 30. First, as shown in FIG. 3C, the fitting 40 is slipped over the end 32 of the jacket 30 and a bead of second braze material 44 is positioned between an outer wall 38 of the jacket 38 and an inner surface 42 of the fitting 40. Although the depicted fitting 40 is a weld or braze socket, it is understood that the fitting 40 may be any fitting that enables attachment of the structure 10 to another device, and may include but is not limited to a weld socket, a braze socket, a threaded fitting, a compression-type fitting, a flange fitting, a custom fitting, and the like.

Once the fitting 40 and the bead of second braze material 44 are positioned as desired with respect to the jacket 30, sufficient heat is applied to the jacket 30 or to the entire structure 10 to melt the second braze material 44. After maintaining a sufficient temperature for a sufficient amount of time, the second braze material forms an allowed joint between the jacket 30 and the fitting 40. The second braze material may be the same as or different from the first braze material. The joint formed by the second braze material 44 is then allowed to cool, so as to solidify and secure the fitting 40 to the jacket 30. Although when affixing the fitting it is not necessary to use a second braze material 44 that does not off-gas, it is still preferable to use a flux-free second braze material to avoid any acid corrosion or pitting that can eventually penetrate the thin jacket wall 30. Fitting 40 shown has an L-shape from a cross-sectional view, and can be used to attach structure 10 to a bracket (not shown).

Figure 4A:
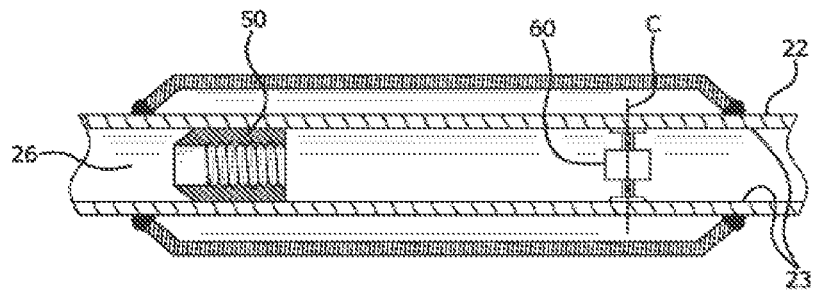
FIGS. 4A-4C are side or axial cross-sectional views illustrating another embodiment of a vacuum insulated structure with different types of fittings.
Figure 4B:
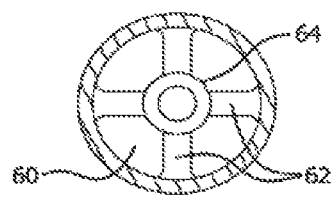

Alternatively, fittings 50, 60, 70, and 80 can be arranged at the tube interior 26 on the inner wall 23, and a similar attachment process can be used as described for fitting 40. For example, FIG. 4A shows a fitting 50 on the left side of tube 20, having a hollow structure and being threaded for engaging with a treaded rod or screw. On the right side of FIG. 4A, another fitting 60 is illustrated, comprised of webs 62 that hold a nut 64 substantially in the center of tube 20, as shown in the cross-sectional view of FIG. 4B. Nut 64 may have a thread in the inner bore with or without a thread. Nut 64 could also just be a thread bore, as in fitting 50.

Figure 4C:
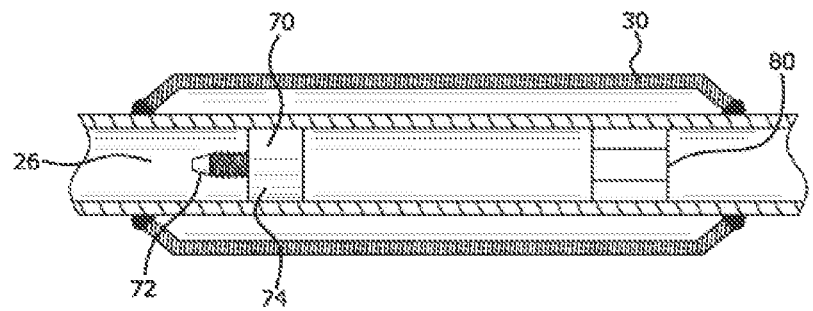

FIG. 4C shows a fitting 70 arranged on the left side of the tube 20, having a blocking body 72 and a threaded rod 74 protruding in an axial direction away from tube 20. In addition, a fitting 80, illustrated on the left side of the figure can be formed as a nut or another structure with a bore. Fittings 50, 60, 70, and 80 can be used for various attachment purposes. For example, fittings 50, 60, 70, and 80 can be used to attach structure 10 to another tube, to an additional casing or insulating structure, or for connection with dewars.

Figure 5A:
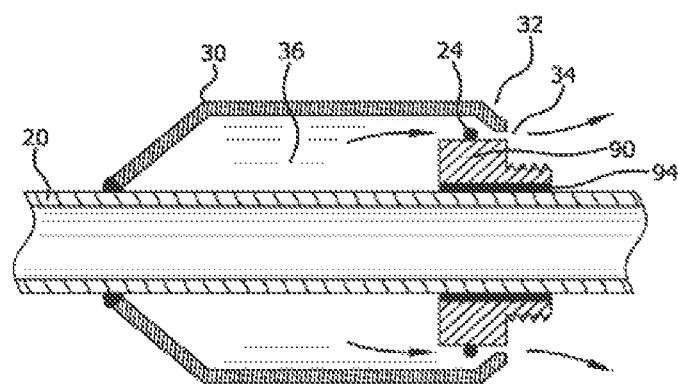
FIGS. 5A and 5B are side views of another embodiment of a vacuum insulated structure with a fitting.

FIG. 5A shows an alternative embodiment in which the fitting 90 is arranged directly onto the tube 20 by use of braze material 94, and is located between tube 20 and jacket 30 as a spacer. In the variant shown, fitting 90 is made of a hollow concentric structure having an inner diameter that is slightly bigger than the outer diameter of tube 20, so that fitting 90 can be placed over tube 20 for brazing, or by another sealed attachment procedure. Fitting has a narrowed protrusion that is threaded, allowing to secure the structure 10 to a corresponding thread. Also, in the variant shown, jacket 30 is affixed to tube 29 on one side, and on the other side is affixed to the fitting 90. It is also possible that two fittings 90 are concentrically arranged at two different locations of tube 20, and that the jacket 30 is not directly attached to the tube 20, but to fittings 90.

Figure 5B:
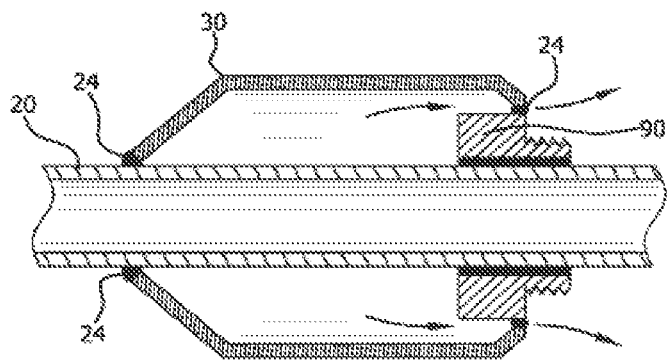

FIG. 5B is an exemplary method of making the vacuum inside the annular insulating space 36, similar to the method shown with respect to FIG. 3A. Space 36 can be evacuated through a vent 34 located adjacent to the end 32 of the jacket 30 and the outer peripheral wall of fitting 90. Before the evacuation, the front end of jacket is brazed to tube 20 with material 24. The insulating space 30 may be evacuated by placing the entire structure 10 into a vacuum chamber and then drawing a vacuum in the chamber. As the pressure in the vacuum chamber decreases, gas escapes from the insulating space 36 via the vent 34. Other methods for applying suction to the vent 34 may alternatively be used.

The foregoing describes the invention in terms of embodiments foreseen by the inventors for which an enabling description was available, notwithstanding that insubstantial modifications of the invention, not presently foreseen, may nonetheless represent equivalents thereto.

What is claimed:

1. A vacuum insulated structure comprising:
   a vessel having an outer surface, and inner surface, and a lumen defined by the inner surface;
   a jacket surrounding at least part of the vessel to enclose an annular insulating space between the vessel and the jacket,
   the jacket having a first converging region that converges toward the vessel, the first converging region having an end that terminates adjacent to the outer surface of the vessel,
   a first seal brazed between the end of the first converging region and the outer surface of the vessel so as to preserve a vacuum within the insulating space; and
   a first fitting disposed between the vessel and the jacket for coupling the vacuum insulated structure to an external device,
   the first fitting forming a seal with the jacket and the vessel.

2. The vacuum insulated structure of claim 1, wherein the jacket has a second converging region that converges toward the vessel.

3. The vacuum insulated structure of claim 1, wherein the first fitting comprises a threaded region.

4. The vacuum insulated structure of claim 1, wherein the first fitting comprises one or more webs configured to support a nut.

5. The vacuum insulated structure of claim 4, wherein the nut is substantially in the center of the interior of the vessel.

6. The vacuum insulated structure of claim 1, wherein the first fitting comprises a rod.

7. The vacuum insulated structure of claim 6, wherein the rod comprises a threaded region.

8. The vacuum insulated structure of claim 1, wherein the fitting comprises a bore therethrough.

9. The vacuum insulated structure of claim 1, wherein the vessel is characterized as having a single inlet.

10. The vacuum insulated structure of claim 9, wherein the first fitting is affixed to the outer surface of the vessel.

11. The vacuum insulated structure of claim 1, wherein the vessel is characterized as a tube.

12. The vacuum insulated structure of claim 11, wherein the vessel is characterized as a closed-ended tube.

13. The vacuum insulated structure of claim 1, wherein the first fitting is affixed at an end of the jacket.

14. The vacuum insulated structure of claim 1, wherein the first fitting is affixed at an intermediate position along the jacket.

15. The vacuum insulated structure of claim 1, wherein the fitting comprises an L-shape.

16. The vacuum insulated structure of claim 1, further comprising a second fitting affixed to at least one of the vessel and the jacket.

17. The vacuum insulated structure of claim 16, wherein the jacket is affixed to the first and second fittings.

* * * * *